M. A. KING.
CONVEYER.
APPLICATION FILED JULY 5, 1911.

1,021,253.

Patented Mar. 26, 1912.
2 SHEETS—SHEET 1.

Marion A. King, Inventor

Witnesses

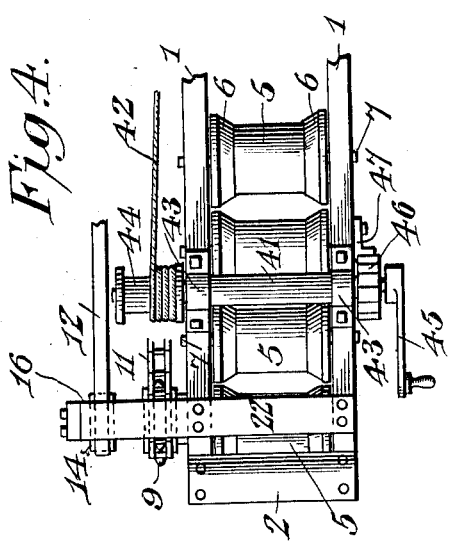

UNITED STATES PATENT OFFICE.

MARION ALFRIED KING, OF NEW CANEY, TEXAS.

CONVEYER.

1,021,253. Specification of Letters Patent. Patented Mar. 26, 1912.

Application filed July 5, 1911. Serial No. 637,023.

*To all whom it may concern:*

Be it known that I, MARION A. KING, a citizen of the United States, residing at New Caney, in the county of Montgomery and State of Texas, have invented a new and useful Conveyer, of which the following is a specification.

The invention relates to improvements in conveyers.

The object of the present invention is to improve the construction of conveyers, and to provide a simple, efficient and comparatively inexpensive conveyer, designed principally for handling sacked grain, and adapted to save time and labor in elevating the same from the ground for loading the sacks into wagons when the grain is threshed and sacked in the field, and also for elevating and conveying sacks of grain from wagons into granaries, depots, warehouses and similar places.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

Figure 1:
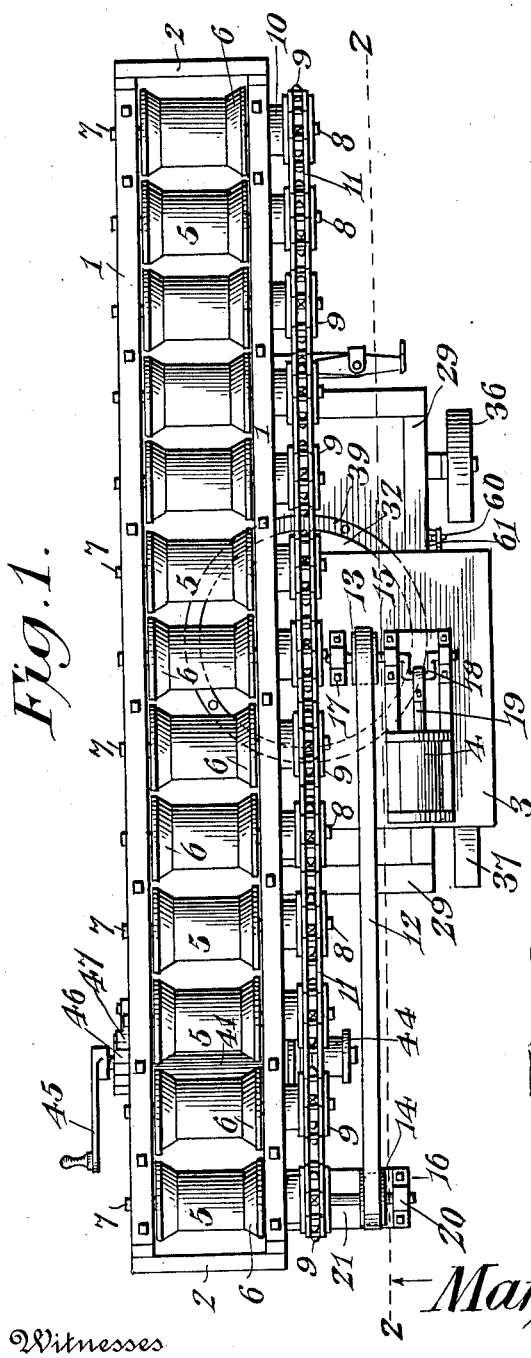
Figure 6:
Figure 3:
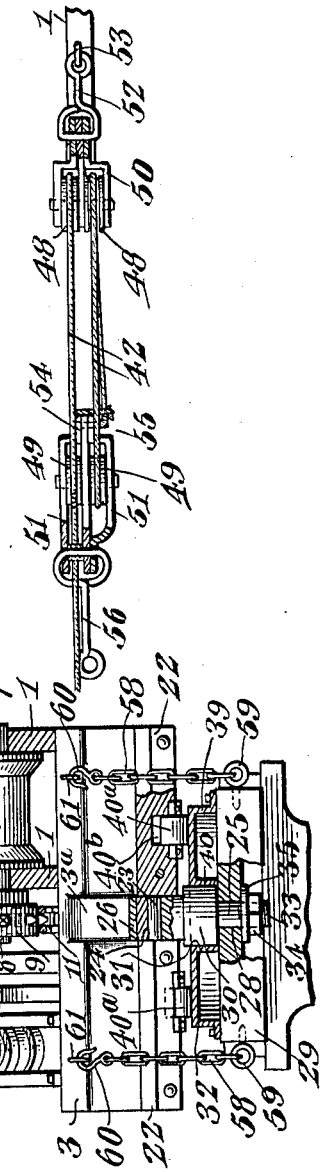

In the drawings:—Figure 1 is a plan view of a conveyer, constructed in accordance with this invention. Fig. 2 is a longitudinal sectional view of the same on the line 2—2 of Fig. 1. Fig. 3 is a transverse sectional view on the line 3—3 of Fig. 2. Fig. 4 is a reverse plan view of one end of the conveyer, illustrating the arrangement of the windlass. Fig. 5 is a reverse plan view of the platform of the conveyer. Fig. 6 is a detail sectional view, illustrating the arrangement of the pulleys and the hoisting rope for tilting the conveyer.

Like numerals of reference designate corresponding parts in all the figures of the drawings.

In the accompanying drawings in which is illustrated the preferred embodiment of the invention, 1 designates a tiltable conveyer frame of approximately oblong shape composed of spaced sides and connecting end bars or pieces 2, and equipped with a transversely disposed platform 3, arranged at a point intermediate of the ends of the conveyer frame and secured to the lower edges of the sides of the same and extending laterally from one side of the conveyer frame to form a support for a gasolene engine 4, or other suitable motor for actuating a series of live rolls 5. The live rolls 5, which are preferably provided with inwardly tapered end flanges 6, are journaled between the sides of the conveyer frame, being preferably mounted on transverse shafts 7, arranged in suitable bearings, which extend from one side of the frame. Extended portions 8 of the shafts or journals have keyed or otherwise secured to them sprocket wheels 9, arranged exteriorly of the conveyer frame and provided at their inner sides with hub portions 10, which space the sprocket wheels from the adjacent side of the frame 1. The sprocket wheels are connected by an endless sprocket chain 11, having its upper flight extending over the series of sprocket wheels and maintained in engagement with the same by gravity, as clearly shown in Figs. 1 and 2 of the drawings, whereby when the sprocket chain is actuated by the means hereinafter described, the rolls will be simultaneously rotated in the same direction.

Motion is communicated to the series of live rolls by means of a belt 12 and inner and outer pulleys 13 and 14, mounted, respectively, on a motor actuated shaft 15 and an extension 16 of the lower end roll. The shaft 15 is journaled in suitable bearings 17 of the platform, and is provided with a crank 18, which is connected with the piston 19 of the gasolene engine 4. The gasolene engine may be of any desired type, and any other form of motor may be employed for rotating the live rolls of the conveyer. The extension 16 of the shaft of the end roll is journaled in a suitable bearing 20, mounted on a support 21 extending laterally from the conveyer frame.

The conveyer frame is equipped at the lower face of the platform 3 with a transverse pivot bar 22, arranged horizontally and provided with a reduced central pivot portion 23, which is mounted in a bearing recess 24 of a vertical pivot 25. The reduced pivot portion 23 of the bar 22 is retained in the recess 24 by an approximately U-shaped cap 26, which is secured by bolts 27, or other suitable fastening devices to the vertical pivot. The horizontal pivot of the conveyer frame permits the latter to tilt for arranging the conveyer at different inclinations.

The vertical pivot 25, which is mounted in a central bearing opening 28, of a wheeled truck frame 29, is provided with an enlarged intermediate bearing portion 30, located within a central bearing opening 31 of a circular metallic bearing plate 32. The lower end 33 of the pivot is threaded for the reception of a nut 34 for securing the pivot in the bearing opening 28 of the truck frame, and a washer 35 is interposed between the nut and the lower face of the frame 29, but any other fastening means may of course be employed for securing the vertical pivot to the truck frame.

The truck frame, which may be of any preferred construction, is preferably provided with front and rear wheels 36 and 37, and it is equipped with a tongue or pole 38 for the attachment of horses, or other draft animals for enabling the conveyer to be readily moved from one plate to another. The metallic circular bearing plate is preferably in the form of a shell and is provided at its periphery with an approximately L-shaped annular flange 39, which is bolted, or otherwise secured to the truck frame. The metallic shell is also provided at the central bearing opening 31 with a depending annular flange 40, supported upon the truck frame and forming a bearing for the intermediate enlarged portion 30 of the vertical pivot. The vertical pivot permits the conveyer frame to be rotated for extending the conveyer in any direction. The transverse pivot bar is equipped with horizontal anti-friction rollers 40ª, journaled in suitable bearings of the pivot bar at suitable recesses 40ᵇ thereof, and arranged to run on the upper face of the circular bearing plate or shell. The anti-friction rollers, which are located at opposite sides of the vertical pivot, are adapted to enable the conveyer frame to turn easily and they relieve the vertical and horizontal pivots of lateral strain.

The conveyer frame is normally arranged at an inclination, and the lower portion is heavier than the upper portion and is adapted to tilt the conveyer frame when the latter is free to move on its horizontal pivot. The conveyer frame is tilted in the opposite direction by means of a windlass 41, and a rope 42, or other flexible connection. The windlass 41, which extends beneath the conveyer frame at the lower portion thereof, is journaled in suitable bearings 43, and it is provided at one end with a drum 44 on which is wound one end of the rope or cable 42. The other end of the windlass is equipped with a crank handle 45, and has keyed or otherwise secured to it a ratchet wheel 46, which is engaged by a suitable pawl 47, which locks the windlass against retrograde rotation and retains the conveyer frame in its tilting adjustment. The rope 42 extends beneath the conveyer frame to the center thereof and passes over the rounded portion of the approximately U-shaped cap 26, and is rove on sheaves 48 and 49 of upper and lower pulley blocks 50 and 51. The platform 3 is provided at its lower face with a groove 3ª, located at the vertical pivot and adapted to provide sufficient space for the passage of the lower portion of the rope or cable 42. The upper pulley block is flexibly connected with one of the sides of the conveyer frame by means of a link 52 and an eye 53, arranged at the lower edge of such side of the conveyer frame. The lower pulley block is provided at one end with an eye 54 to receive the other end 55 of the rope or cable 42, and the lower pulley block, which is arranged at an inclination, is connected at its lower end by a link 56 with an eye 57, which is mounted on the vertical pivot 31. When the windlass is rotated in a direction to wind the cable around it, the pull on the cable will swing the upper end of the inclined conveyer frame downwardly, and when the windlass is rotated in the opposite direction to unwind the cable, the weight of the lower portion of the conveyer frame will swing the latter in the opposite direction. The particular manner of mounting the mechanism for tilting the conveyer frame does not interfere with its horizontal swinging movement on the vertical pivot. The truck is equipped at opposite sides with chains 58, secured at one end to the sides of the truck frame by suitable eyes 59, and provided at their free ends with hooks 60, adapted to engage eyes 61 of the platform 3 for maintaining the conveyer frame in a steady position on the truck while the conveyer is being transferred from one point to another. The eyes 61 are preferably arranged at the upper front edge of the platform, as clearly illustrated in Figs. 2 and 3 of the drawings. Any other suitable means, however, may be employed for connecting the conveyer frame with the truck frame.

The conveyer frame is adapted to be tilted to arrange it at the desired inclination, and it may be readily swung on its vertical pivot to extend it in the proper direction, and the live rolls may be rotated in either direction for carrying sacks of grain or other material from one point to another. The conveyer enables sacks of grain to be easily and quickly unloaded from a wagon and run into a warehouse or other place, and it will also enable wagons to be rapidly loaded when grain is threshed and sacked in the field.

Having thus fully described my invention, what I claim as new and desire to secure by Letters Patent, is:—

1. A conveyer of the class described comprising a vertical pivot, means for mounting the same, a tiltable conveyer frame having a horizontal pivot mounted on and carried by the vertical pivot, conveying mechanism carried by the conveyer frame, and means for tilting the latter including a windlass arranged at one end of the conveyer frame, pulleys connected, respectively, with the pivot and the other end of the conveyer frame, and a flexible connection having one end connected with the windlass and extending therefrom to the said pulleys and arranged on the same.

2. A conveyer of the class described comprising a vertical pivot provided at the top with a bearing recess, a tiltable conveyer frame provided with a platform having a central groove, a pivot bar secured to the platform and provided with a pivot portion located at the groove thereof and mounted in the bearing of the vertical pivot, a cap secured to the vertical pivot and retaining the pivot portion of the pivot bar in the said bearing recess, conveying means carried by the conveyer frame, and means for tilting the conveyer frame including a windlass arranged at one end of the frame, pulley blocks provided with sheaves and connected, respectively, with the vertical pivot and with the other end of the conveyer frame, and a flexible connection having one end attached to the windlass and extending therefrom over the vertical pivot at the groove of the platform to the pulley blocks and arranged on the sheaves thereof.

3. A conveyer of the class described comprising a truck, a vertical pivot mounted on the truck, a tiltable conveyer frame provided at an intermediate point with a platform and having a horizontal transverse pivot mounted on and carried by the said vertical pivot, conveying means mounted on the conveyer frame, and means for tilting the platform including a windlass located between the conveyer frame and extending across the same at one end thereof, said windlass being provided at one side of the frame with operating means and having a drum located at the other side of the frame, a rope arranged on the drum and extending therefrom over the central pivot, and pulleys receiving the rope and connected with the other end of the conveyer frame and with the vertical pivot.

In testimony, that I claim the foregoing as my own, I have hereto affixed my signature in the presence of two witnesses.

MARION ALFRIED KING.

Witnesses:
ALBERT CHAMBERS, Jr.,
W. B. DAVIS.

---

Copies of this patent may be obtained for five cents each, by addressing the "Commissioner of Patents, Washington, D. C."